Patented July 3, 1923.

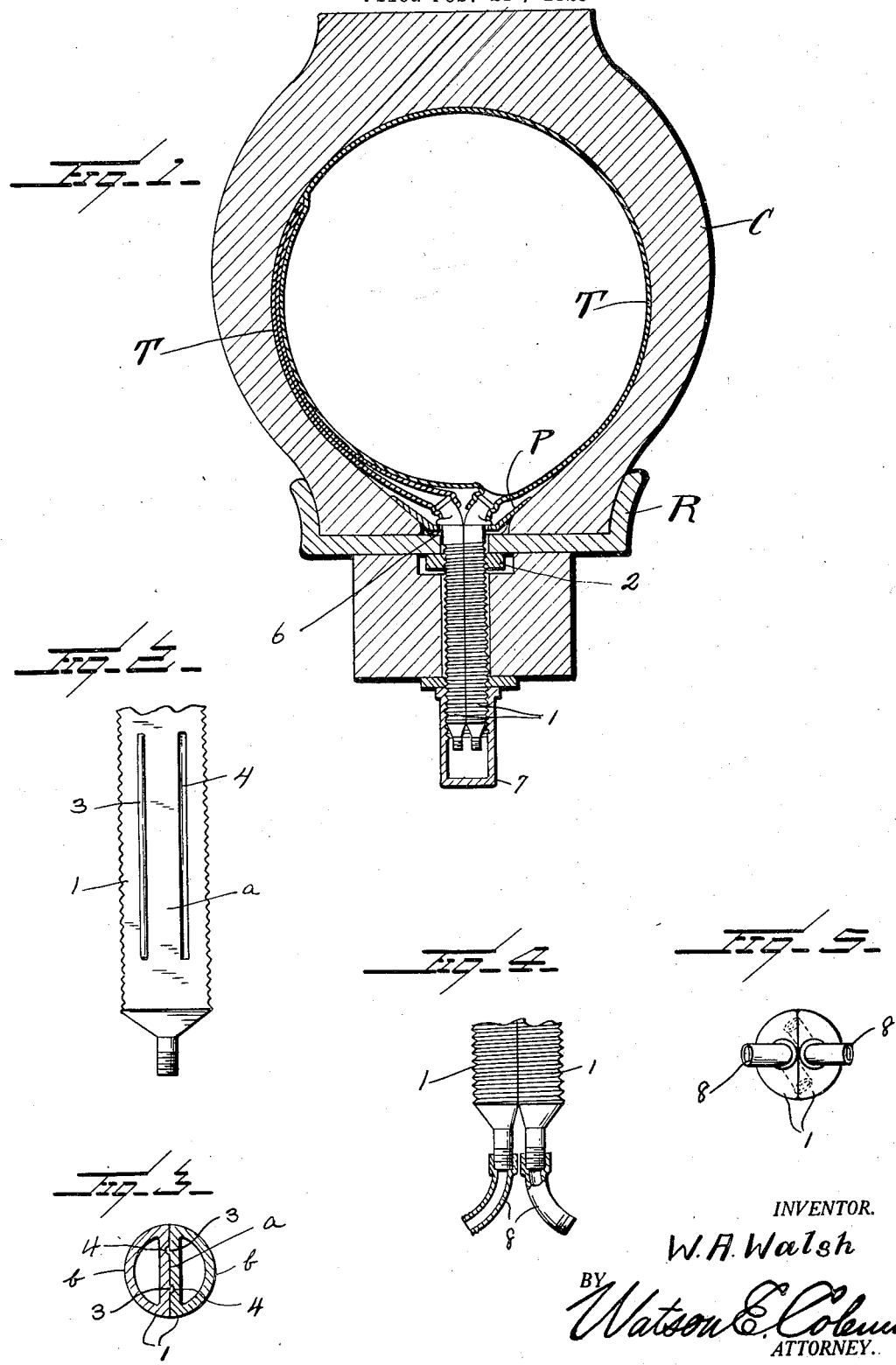

1,460,775

UNITED STATES PATENT OFFICE.

WILLIAM A. WALSH, OF AVOCA, PENNSYLVANIA.

TIRE STRUCTURE.

Application filed February 28, 1923. Serial No. 621,797.

*To all whom it may concern:*

Be it known that I, WILLIAM A. WALSH, a citizen of the United States, residing at Avoca via Pittston, in the county of Luzerne and State of Pennsylvania, have invented certain new and useful Improvements in Tire Structures, of which the following is a specification, reference being had to the accompanying drawings.

This invention relates to certain improvements in tire structures and has relation more particularly to a device of this general character of a pneumatic type and it is an object of the invention to provide a novel and improved structure of this character wherein a plurality of inner tubes are arranged within the casing or carcass, each of said tubes being capable of independent inflation, one of said tubes being deflated while the other is inflated.

Another object of the invention is to provide a novel and improved structure of this general character employing a plurality of inner tubes each having an individual valve stem, the stems of all of the tubes being insertible through a single opening through the rim and wherein a member common to all of the stems is employed for locking the same in applied position.

The invention consists in the details of construction and in the combination and arrangement of the several parts of my improved tire structure whereby certain important advantages are attained and the device rendered simpler, less expensive and otherwise more convenient and advantageous for use, as will be hereinafter more fully set forth.

In order that my invention may be the better understood, I will now proceed to describe the same with reference to the accompanying drawings, wherein:—

Figure 1 is a transverse sectional view taken through a tire structure and an associated rim constructed in accordance with an embodiment of my invention;

Figure 2 is a fragmentary elevational view of a stem of one of the inner tubes;

Figure 3 is a transverse sectional view taken through a pair of assembled stems;

Figure 4 is a fragmentary view partly in elevation and partly in section illustrating a further embodiment of my invention;

Figure 5 is a view in elevation of the outer end of the structure as illustrated in Figure 4, a second position of each of the supplemental stems being indicated by dotted lines.

As disclosed in the accompanying drawings, C denotes a tire casing or carcass adapted to be mounted in a conventional manner upon a rim R. Arranged within the casing or carcass C is a plurality of inner tubes T, two in number and each having secured thereto in a conventional manner a valve stem 1.

When the tubes T are applied within the casing or carcass C the stems 1 are arranged side by side. Each of the stems is substantially semi-circular in cross section so that the straight or flat faces $a$ thereof will be in close contact one with the other. The rounded faces $b$ of the stems 1 are threaded so as to have engaged therewith a holding nut or member 2 of a conventional type.

The flat faces $a$ of the stems 1 are provided with interfitting ribs and grooves 3 and 4, one of said ribs or grooves being carried by each face $a$. The interfitting ribs and grooves 3 and 4 assure the maintenance of the stems 1 in proper relation and which is of particular advantage in applying the holding member or nut 2. Arranged within the casing or carcass C is a type plate P having a central opening 6 through which the stems 1 are also directed, said plate P being of such configuration to prevent clinching of the tubes T.

A cap 7 is adapted to be applied over the extended portions of the stems, said cap being of any type preferred but as herein disclosed said cap is adapted to be screwed upon the stems 1. However I do not wish to be understood as limiting myself to this type as said cap can also be made of rubber or other material and freely slipped upon the stems.

In practice the tubes are adapted to be separately coupled or in other words when one of said tubes T is inflated the other is deflated so that in the event the tube in use becomes punctured or otherwise unfit for use the second tube can be readily brought into play. The stems 1 are adapted to have separately or independently coupled thereto an inflating pump or the like.

If preferred the outer end portion of each of the stems 1 may have applied thereto a supplemental stem 8 having its outer end portion disposed on a suitable curvature. This is to facilitate under certain conditions the requisite coupling of a stem 1 with the fitting of an air pump or the like. When these supplemental stems 8 are turned inwardly about one-half turn they will offer no obstruction to the application of the cap 7.

In my improved arrangement either one of the tubes T can be readily and conveniently removed or applied independently of the other and no change need be made in the structure of the rims or wheels now generally in use.

From the foregoing description it is thought to be obvious that a tire structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An inflatable tire comprising a casing, independent tubes arranged therein, each of said tubes having individual valve stems, and a holding member common to both of the stems, said stems being positioned one adjacent to the other and having opposed flat surfaces substantially in contact, said flat faces having interfitting ribs and grooves.

2. An inflatable tire comprising a casing, independent tubes arranged therein, each of said tubes having individual valve stems, and a holding member common to both of the stems, said stems being positioned one adjacent to the other and having opposed flat surfaces substantially in contact, said flat faces having coacting means maintaining the stems in assembled relation.

In testimony whereof I hereunto affix my signature.

WILLIAM A. WALSH.